(12) United States Patent
Ueda et al.

(10) Patent No.: US 10,309,248 B2
(45) Date of Patent: Jun. 4, 2019

(54) VARIABLE GEOMETRY SYSTEM TURBOCHARGER

(71) Applicant: IHI Corporation, Koto-ku (JP)

(72) Inventors: Takafumi Ueda, Tokyo (JP); Akira Iwakami, Tokyo (JP)

(73) Assignee: IHI Corporation, Koto-ku (JP)

( * ) Notice: Subject to any disclaimer, the term of this patent is extended or adjusted under 35 U.S.C. 154(b) by 425 days.

(21) Appl. No.: 15/151,946

(22) Filed: May 11, 2016

(65) Prior Publication Data

US 2016/0258316 A1 Sep. 8, 2016

Related U.S. Application Data

(63) Continuation of application No. PCT/JP2014/083079, filed on Dec. 15, 2014.

(30) Foreign Application Priority Data

Jan. 29, 2014 (JP) ................. 2014-014481

(51) Int. Cl.
*F01D 9/04* (2006.01)
*F01D 11/00* (2006.01)
(Continued)

(52) U.S. Cl.
CPC .......... *F01D 17/165* (2013.01); *F01D 9/041* (2013.01); *F01D 9/045* (2013.01); *F01D 11/005* (2013.01);
(Continued)

(58) Field of Classification Search
CPC ........ F01D 17/165; F01D 9/041; F01D 9/045; F01D 25/145; F05D 2260/231
See application file for complete search history.

(56) References Cited

U.S. PATENT DOCUMENTS 4,804,316 A * 2/1989 Fleury ................... F01D 17/165
415/134
5,403,150 A * 4/1995 McEachern, Jr. ...... F01D 25/125
384/478
(Continued)

FOREIGN PATENT DOCUMENTS

JP 60-88039 U 6/1985
JP 63-118338 U 7/1988
(Continued)

OTHER PUBLICATIONS

English translation of the International search opinion dated Feb. 17, 2015 in PCT/JP2014/083079.*
(Continued)

*Primary Examiner* — Igor Kershteyn
*Assistant Examiner* — Topaz L. Elliott
(74) *Attorney, Agent, or Firm* — Oblon, McClelland, Maier & Neustadt, L.L.P.

(57) ABSTRACT

A variable geometry system turbocharger includes an annular heat shield plate which shields heat from a turbine wheel side. The heat shield plate is integrally provided at a central part of a side surface of a bearing housing opposed to a back surface of a turbine disk. A first seal ring is provided between an inner peripheral surface of a first nozzle ring and an outer peripheral surface of the heat shield plate. A second seal ring is provided between an inner peripheral surface of a second nozzle ring and an outer peripheral surface of a protrusion of a turbine housing.

8 Claims, 5 Drawing Sheets

(51) Int. Cl.
    *F01D 17/16*     (2006.01)
    *F01D 25/14*     (2006.01)
    *F01D 25/24*     (2006.01)
    *F02B 37/24*     (2006.01)
    *F02B 39/00*     (2006.01)
    *F01N 13/14*     (2010.01)

(52) U.S. Cl.
    CPC ......... *F01D 25/145* (2013.01); *F01D 25/246* (2013.01); *F02B 37/24* (2013.01); *F01N 13/14* (2013.01); *F02B 39/00* (2013.01); *F05D 2220/40* (2013.01); *F05D 2260/231* (2013.01); *Y02T 10/144* (2013.01)

(56) References Cited

U.S. PATENT DOCUMENTS

| | | | | |
|---|---|---|---|---|
| 5,964,574 A * | 10/1999 | Meier | ............. | F01D 9/045 415/110 |
| 6,155,780 A * | 12/2000 | Rouse | ............. | F01D 5/043 415/173.3 |
| 6,739,134 B2 * | 5/2004 | Fledersbacher | ....... | F01D 17/165 415/157 |
| 7,021,057 B2 * | 4/2006 | Sumser | ............. | F01D 17/165 415/163 |
| 7,121,788 B2 * | 10/2006 | Daudel | ............. | F01D 17/165 415/159 |
| 7,802,429 B2 * | 9/2010 | Yokoyama | ............. | F01D 9/026 60/605.1 |
| 8,333,556 B2 * | 12/2012 | Hettinger | ............. | F01D 17/165 415/165 |
| 9,284,951 B2 * | 3/2016 | Wang | ............. | F01D 15/10 |
| 9,683,456 B2 * | 6/2017 | Burmester | ............. | F02C 6/12 |
| 2006/0127242 A1 * | 6/2006 | Martin | ............. | F04D 25/04 417/407 |
| 2009/0092483 A1 * | 4/2009 | Yasui | ............. | F01D 17/165 415/159 |
| 2016/0245160 A1 * | 8/2016 | Ueda | ............. | F02B 37/24 |
| 2017/0370225 A1 * | 12/2017 | Itoh | ............. | F01D 5/046 |

FOREIGN PATENT DOCUMENTS

| | | |
|---|---|---|
| JP | 1-80633 U | 5/1989 |
| JP | 3-35203 U | 4/1991 |
| JP | 6-108867 | 4/1994 |
| JP | 2009-243300 | 10/2009 |
| JP | 2009-243431 | 10/2009 |
| JP | 2009-243432 | 10/2009 |
| JP | 2010-71142 | 4/2010 |
| JP | 2011-252439 | 12/2011 |
| JP | 2012-62808 | 3/2012 |
| JP | 2013-130116 | 7/2013 |
| JP | 2013163972 A * | 8/2013 |
| JP | 2013-194546 | 9/2013 |
| JP | 2013-231404 | 11/2013 |
| JP | 2013-245655 | 12/2013 |
| JP | 2013-253521 A | 12/2013 |

OTHER PUBLICATIONS

Office Action dated Apr. 3, 2018 in Japanese Patent Application No. 2014-014481.
Office Action dated Oct. 24, 2017 in Japanese Patent Application No. 2014-014481.
International Search Report dated Feb. 17, 2015 in PCT/JP2014/083079 filed on Dec. 15, 2014 (with English translation).
Written Opinion dated Feb. 17, 2015 in PCT/JP2014/083079 filed on Dec. 15, 2014.

* cited by examiner

VARIABLE GEOMETRY SYSTEM TURBOCHARGER

CROSS REFERENCE TO RELATED APPLICATIONS

This application is a continuation application of International Application No. PCT/JP2014/083079, filed on Dec. 15, 2014, which claims priority to Japanese Patent Application No. 2014-014481, filed on Jan. 29, 2014, the entire contents of which are incorporated by reference herein.

BACKGROUND

1. Technical Field

The present disclosure relates to a variable geometry system turbocharger equipped with a variable nozzle unit which adjusts a passage area (a throat area) for exhaust gas to be supplied to a turbine wheel side.

2. Description of the Related Art

A variable geometry system turbocharger is equipped with a variable nozzle unit which adjusts a passage area (a throat area) for exhaust gas to be supplied to a turbine wheel side (see Japanese Patent Application Laid-open Publication Nos. 2013-130116 and 2013-194546). The variable nozzle unit is disposed between a turbine scroll passage and the turbine wheel in a turbine housing adjacent to a bearing housing. Configurations of the conventional variable nozzle unit and its surrounding components are as follows.

A first nozzle ring is disposed in the turbine housing. A second nozzle ring is provided integrally with the first nozzle ring at a position away from the first nozzle ring in an axial direction (an axial direction of the turbine wheel). The first nozzle ring has a surface (an opposed surface) which is opposed to the second nozzle ring. Likewise, the second nozzle ring has a surface (an opposed surface) which is opposed to the first nozzle ring. Moreover, variable nozzles are disposed between the opposed surface of the first nozzle ring and the opposed surface of the second nozzle ring. The variable nozzles are disposed at intervals in a circumferential direction (a predetermined circumferential direction). Each variable nozzle is rotatable in forward and reverse directions (opening and closing directions) around a shaft center which is parallel to a shaft center of the turbine wheel. A link mechanism is disposed on an opposite surface side from the opposed surface of the first nozzle ring. The link mechanism rotates the variable nozzles synchronously in the forward and reverse directions. The passage area (the throat area) of the exhaust gas to be supplied to the turbine wheel side is increased when the link mechanism rotates the variable nozzles synchronously in the forward direction (the opening direction). On the other hand, the passage area is reduced when the link mechanism rotates the variable nozzles synchronously in the reverse direction (the closing direction).

The bearing housing has a side surface which is opposed to a back surface of the turbine wheel. An annular protrusion is formed at a central part of the side surface. The protrusion protrudes toward the back surface of the turbine wheel. Meanwhile, an annular heat shield plate is fitted to an outer peripheral surface of the protrusion of the bearing housing. The heat shield plate shields heat from the back surface side of the turbine wheel. A biasing member is provided at a position on the outer peripheral surface of the protrusion of the bearing housing, the position being adjacent to the heat shield plate. The biasing member is formed from a wave washer or the like, which biases the heat shield plate in a direction to bring the heat shield plate into pressure contact with an inner peripheral edge portion of the first nozzle ring. Here, a press-contacting portion between the first nozzle ring and the heat shield plate is a sealing portion for suppressing a leakage of the exhaust gas from the opposite surface side from the opposed surface of the first nozzle ring to an inlet side of the turbine wheel.

SUMMARY

The biasing member such as the wave washer is necessary for suppressing the above-mentioned leakage of the exhaust gas. However, this means that biasing force of the biasing member acts on the variable nozzle unit as force in an axial direction. Accordingly, the biasing force tends to complicate a thermal deformation of the variable nozzle unit when the variable geometry system turbocharger is in operation. Then, when the variable geometry system turbocharger is in operation, the parallelism between the opposed surfaces of the first nozzle ring and the second nozzle ring is likely to be deteriorated depending on an operation condition of an engine. For this reason, a nozzle side clearance is usually set somewhat large so as to sufficiently ensure operational reliability of the variable nozzles, or in other words, operational reliability of the variable geometry system turbocharger even if the parallelism is deteriorated.

In the meantime, if the nozzle side clearance is set somewhat large, there is a concern of reduction in turbine efficiency of the variable geometry system turbocharger due to an increase in leakage flow (clearance flow) from the nozzle side clearance. When there is such a concern, a further improvement in turbine efficiency of the variable geometry system turbocharger is desired. Here, the nozzle side clearance means a gap between the first nozzle ring and the variable nozzles or a gap between the second nozzle ring and the variable nozzles. To be more precise, the nozzle side clearance means a gap between the opposed surface of the first nozzle ring and side surfaces of the variable nozzles on one side in the axial direction or a gap between the opposed surface of the second nozzle ring and side surfaces of the variable nozzles on the other side in the axial direction. The former gap will be referred to as a nozzle side clearance on the first nozzle ring side and the latter gap will be referred to as a nozzle side clearance on the second nozzle ring side.

An object of the present disclosure is to provide a variable geometry system turbocharger which can solve the aforementioned problem.

An aspect of the present disclosure is a variable geometry system turbocharger comprising a variable nozzle unit disposed between a turbine scroll passage and a turbine wheel in a turbine housing adjacent to a bearing housing and configured to adjust a passage area for exhaust gas to be supplied to the turbine wheel side. The variable nozzle unit includes: a first nozzle ring disposed in the turbine housing; a second nozzle ring provided integrally with the first nozzle ring at a position away from and opposed to the first nozzle ring in an axial direction; variable nozzles disposed at intervals in a circumferential direction between the first nozzle ring and the second nozzle ring, and configured to be rotatable in forward and reverse directions around shaft centers parallel to a shaft center of the turbine wheel; a link mechanism configured to rotate the variable nozzles synchronously in opening and closing directions; an annular heat shield plate provided at a side surface of the bearing housing opposed to a back surface of the turbine wheel, and configured to shield heat from the turbine wheel side; and a seal member provided between an inner peripheral surface of the first nozzle ring and an outer peripheral surface of the heat shield plate.

In the specification and claims of the present application, the expression "disposed" is intended to include a state of being disposed indirectly with a different member interposed in between as well as a state of being disposed directly on, and the expression "provided" is intended to include a state of being provided indirectly with a different member interposed in between as well as a state of being provided directly on. Meanwhile, the expression "axial direction" means an axial direction of the turbine wheel (in other words, an axial direction of the first nozzle ring or the second nozzle ring). Moreover, the expression "attachment bolt" is intended to include a countersunk bolt, a button bolt, a hexagon socket bolt, and the like. Further, the expression "radial direction" means a radial direction of the turbine wheel (in other words, a radial direction of the first nozzle ring or the second nozzle ring).

According to the present disclosure, a nozzle side clearance can be set small while suppressing a leakage of exhaust gas from the opposite surface side from the opposed surface of the first nozzle ring toward the inlet side of the turbine wheel and sufficiently ensuring the parallelism between the opposed surface of the first nozzle ring and the opposed surface of the second nozzle ring when the variable geometry system turbocharger is in operation. Thus, it is possible to further improve turbine efficiency of the variable geometry system turbocharger while sufficiently ensuring operational reliability of the variable geometry system turbocharger and reducing a leakage flow from the nozzle side clearance.

DESCRIPTION OF THE EMBODIMENTS

An embodiment of the present disclosure will be described below with reference to FIG. 1 to FIG. 3. Here, as shown in the drawings, "L" indicates a left direction, "R" indicates a right direction, "D1" indicates an axial direction, and "D2" indicates a radial direction.

Figure 3:
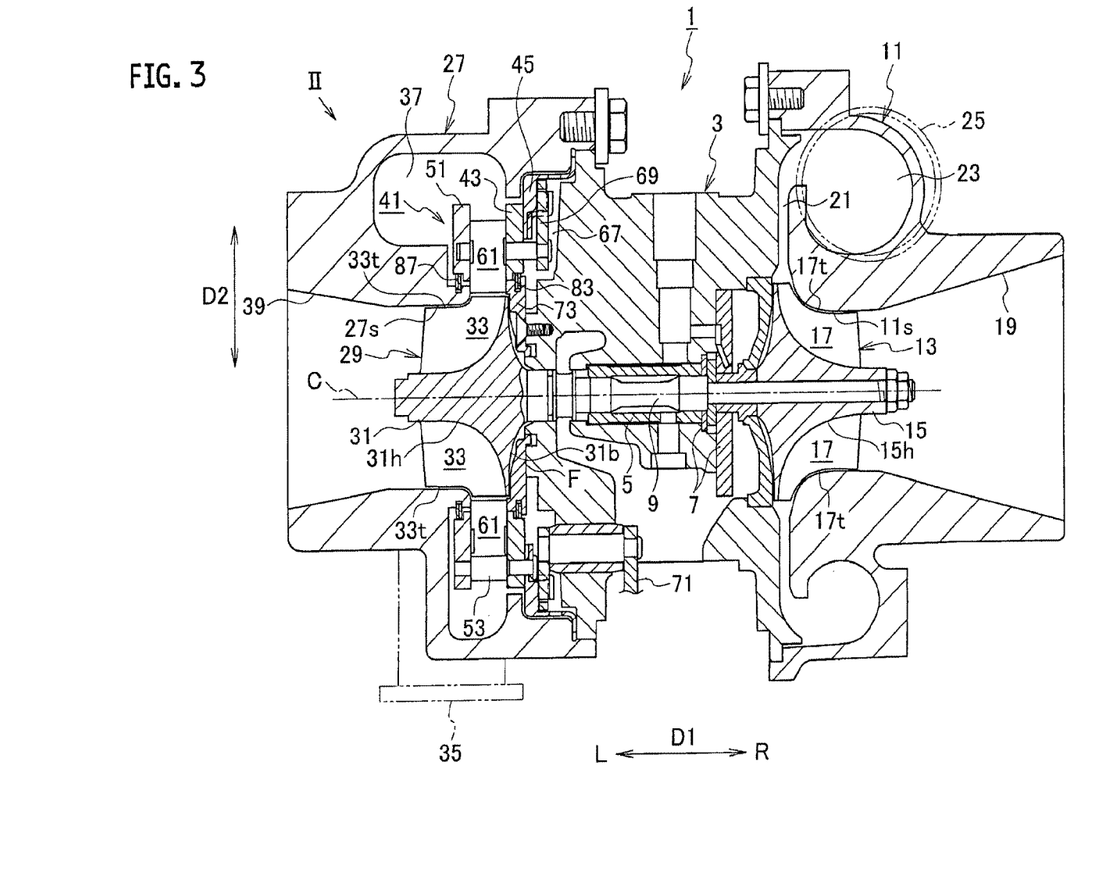
FIG. 3 is a front sectional view of the variable geometry system turbocharger according to the embodiment of the present disclosure.

As shown in FIG. 3, a variable geometry system turbocharger 1 according to the embodiment of the present disclosure supercharges (compresses) air to be supplied to an engine (not shown) by using energy of exhaust gas from the engine.

The variable geometry system turbocharger 1 includes a bearing housing (a center housing) 3. A radial bearing 5 and a pair of thrust bearings 7 are provided in the bearing housing 3. Moreover, a rotor shaft (a turbine shaft) 9 extending in a right-left direction is rotatably provided to the bearings 5 and 7. In other words, the rotor shaft 9 is rotatably provided to the bearing housing 3 through the bearings 5 and 7.

A compressor housing 11 is provided adjacent to a right side of the bearing housing 3. The compressor housing 11 includes a shroud 11s in the inside thereof. A compressor wheel 13 is provided in the compressor housing 11. The compressor wheel 13 is provided rotatably around its shaft center (in other words, a shaft center of the rotor shaft 9) C, and compresses the air by using centrifugal force. Moreover, the compressor wheel 13 includes a compressor disk 15 which is integrally connected to a right end portion of the rotor shaft 9. A hub surface 15h of the compressor disk 15 extends outward in the radial direction (outward in the radial direction of the compressor wheel 13) and toward the left side. Furthermore, compressor blades 17 are integrally provided to the hub surface 15h of the compressor disk 15 at intervals in a circumferential direction. A tip end edge (an outer edge) 17t of each compressor blade 17 extends along the shroud 11s of the compressor housing 11. Here, different compressor blades (not shown) having a shorter axial length than that of the compressor blades 17 may be used in addition to the compressor blades 17. In this case, the different compressor blades (not shown) are integrally provided to the hub surface 15h of the compressor disk 15 and are arranged alternately with the compressor blades 17.

An air intake port 19 for taking in the air is formed on an inlet side (an upstream side as viewed in a flowing direction of a mainstream of the air) of the compressor wheel 13 in the compressor housing 11. The air intake port 19 is connected to an air cleaner (not shown) which cleans the air. On the other hand, an annular diffuser passage 21 to increase pressure of the compressed air is formed on an outlet side (a downstream side in the flowing direction of the air) of the compressor wheel 13 between the bearing housing 3 and the compressor housing 11. In addition, a spiral-shaped compressor scroll passage 23 is formed inside the compressor housing 11. The compressor scroll passage 23 communicates with the diffuser passage 21. Moreover, an air exhaust port 25 for discharging the air that is compressed (the compressed air) is formed at an appropriate position of the compressor housing 11. The air exhaust port 25 communicates with the compressor scroll passage 23 and is connected to an intake manifold (not shown) of the engine.

Figure 2:
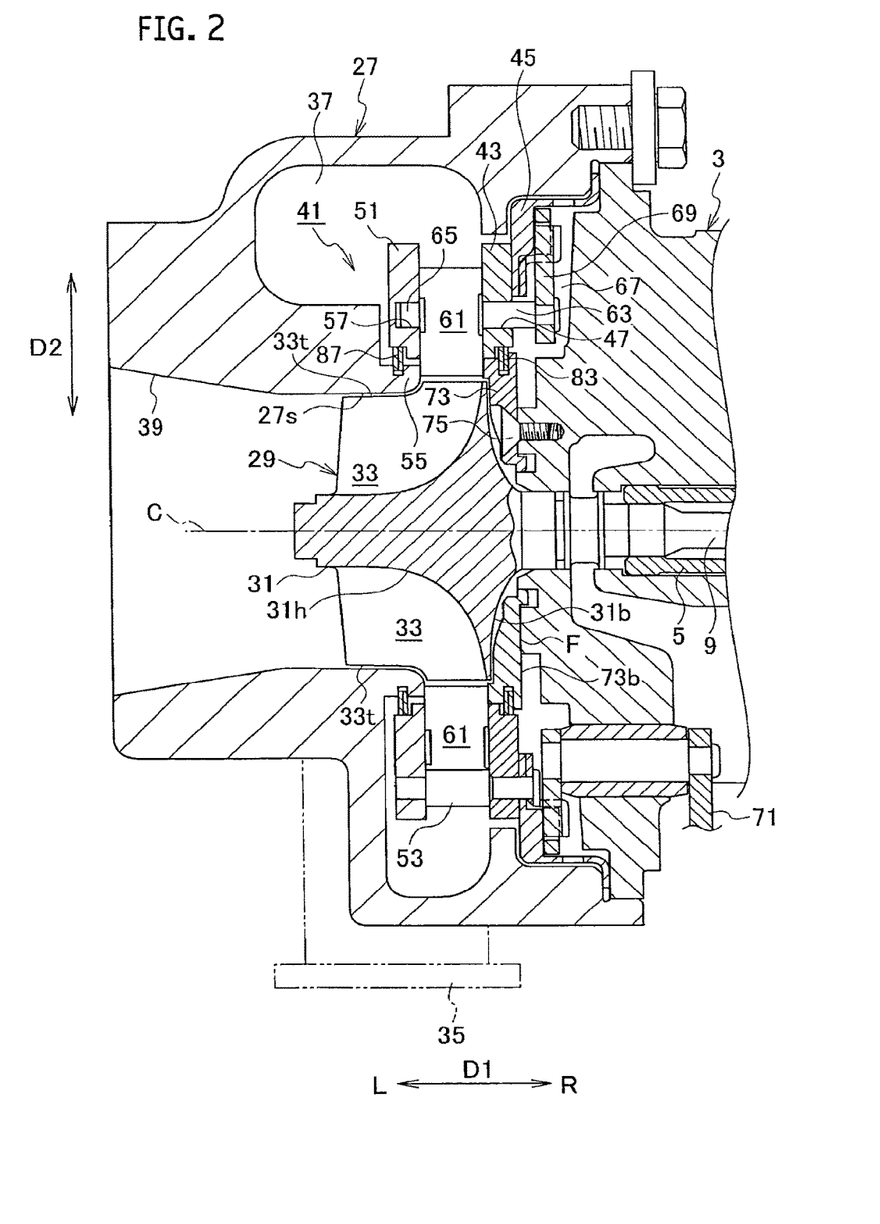
FIG. 2 is an enlarged view of a portion viewed along an arrow II in FIG. 3.

As shown in FIG. 2 and FIG. 3, a turbine housing 27 is provided adjacent to a left side of the bearing housing 3. The turbine housing 27 includes a shroud 27s in the inside thereof. Moreover, a turbine wheel 29 is provided in the turbine housing 27. The turbine wheel 29 is provided rotatably around its shaft center (in other words, the shaft center of the rotor shaft 9) C, and the turbine wheel 29 generates rotational force (rotation torque) by using pressure energy of the exhaust gas. The turbine wheel 29 includes a turbine disk 31 which is integrally provided to a left end portion of the rotor shaft 9. A hub surface 31h of the turbine disk 31 extends outward in the radial direction (outward in the radial direction of the turbine wheel 29) and toward the right side (one side in the axial direction of the turbine wheel 29). Furthermore, turbine blades 33 are integrally provided to the hub surface 31h of the turbine disk 31 at intervals in a circumferential direction. A tip end edge (an outer edge) 33t of each turbine blade 33 extends along the shroud 27s of the turbine housing 27.

A gas intake port 35 for taking in the exhaust gas is formed at an appropriate position of the turbine housing 27.

The gas intake port 35 is connected to an exhaust manifold (not shown) of the engine. A spiral-shaped turbine scroll passage 37 is formed on an inlet side (an upstream side as viewed in a flowing direction of a mainstream of the exhaust gas) of the turbine wheel 29 inside the turbine housing 27. The turbine scroll passage 37 communicates with the gas intake port 35. Moreover, a gas exhaust port 39 for discharging the exhaust gas is formed on an outlet side (a downstream side as viewed in the flowing direction of the mainstream of the exhaust gas) of the turbine wheel 29 in the turbine housing 27. The gas exhaust port 39 is connected to an exhaust emission control system (not shown) which cleans the exhaust gas.

The variable geometry system turbocharger 1 is equipped with a variable nozzle unit 41 which adjusts a passage area (a throat area) of the exhaust gas to be supplied to the turbine wheel 29 side. The variable nozzle unit 41 is disposed between the turbine scroll passage 37 and the turbine wheel 29 in the turbine housing 27.

Next, a specific configuration of the variable nozzle unit 41 will be described.

Figure 1:
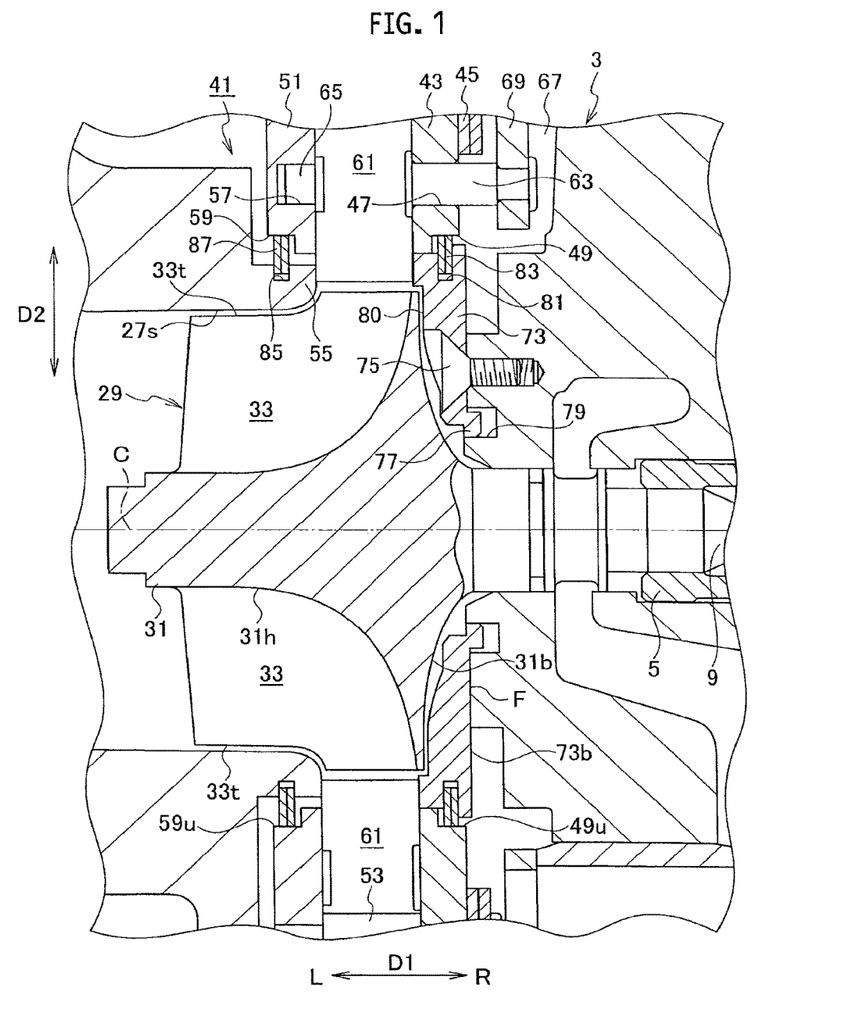
FIG. 1 is a cross-sectional view showing characteristic portions of a variable geometry system turbocharger according to an embodiment of the present disclosure.

As shown in FIG. 1 and FIG. 2, a first nozzle ring 43 is disposed between the turbine scroll passage 37 and the turbine wheel 29 in the turbine housing 27. The first nozzle ring 43 is disposed concentrically with the turbine wheel 29 through a cup-shaped support ring 45. Meanwhile, bottomless (penetrating) first support holes 47 (only one of which is illustrated) are formed at equal intervals in a circumferential direction (a predetermined circumferential direction) in the first nozzle ring 43. An annular first stepped portion 49 is provided in an inner peripheral surface of the first nozzle ring 43, and is formed to recede outward in the radial direction. Here, an outer peripheral edge portion of the support ring 45 is sandwiched between a left side portion of the bearing housing 3 and a right side portion of the turbine housing 27. The first support holes 47 are arranged at equal intervals in a circumferential direction. However, the intervals do not have to be equal.

A second nozzle ring 51 is provided at a position away from and opposed to the first nozzle ring 43 in the axial direction (the axial direction of the turbine wheel 29, or in other words, the right-left direction). The second nozzle ring 51 is provided integrally and concentrically with the first nozzle ring 43 with connecting pins 53 (only one of which is illustrated) interposed in between. The second nozzle ring 51 surrounds an annular protrusion 55. Here, the protrusion 55 is formed to protrude in the right direction (the one side in the axial direction) between the turbine scroll passage 37 and the turbine wheel 29 in the turbine housing 27. In other words, the second nozzle ring 51 is located on the outside in the radial direction of the annular protrusion 55 of the turbine housing 27. Bottomed second support holes 57 (only one of which is illustrated) are formed in the second nozzle ring 51 in such a way as to align with the first support holes 47 in the first nozzle ring 43. An annular second stepped portion 59 is provided in an inner peripheral surface of the second nozzle ring 51, and is formed to recede outward in the radial direction. The first nozzle ring 43 has a surface (an opposed surface) which is opposed to the second nozzle ring 51. Likewise, the second nozzle ring 51 has a surface (an opposed surface) which is opposed to the first nozzle ring 43. The connecting pins 53 have a function to set an interval between the opposed surface of the first nozzle ring 43 and the opposed surface of the second nozzle ring 51.

Here, an opposite surface (a right side surface) side from the opposed surface of the first nozzle ring 43 communicates with the turbine scroll passage 37 via a through-hole (not shown) formed in the support ring 45. Meanwhile, an inner diameter of the first nozzle ring 43 and an inner diameter of the second nozzle ring 51 are set to an equal dimension, while an outer diameter of the first nozzle ring 43 and an outer diameter of the second nozzle ring 51 are set to an equal dimension. Note that the term "equal" means to be substantially equal and includes a margin of error to the extent not causing structural or operational problems. Such a margin of error is set in a range of ±5 mm, for example.

Variable nozzles 61 are disposed between the opposed surface (a left side surface) of the first nozzle ring 43 and the opposed surface (a right side surface) of the second nozzle ring 51. The variable nozzles 61 are disposed at equal intervals in a circumferential direction (a predetermined circumferential direction) in such a way as to surround the inlet side of the turbine wheel 29. Each variable nozzle 61 is rotatable in opening and closing directions (forward and reverse directions) around a shaft center which is parallel to the shaft center C of the turbine wheel 29. A first nozzle shaft 63 is integrally formed at a right side surface (a side surface on one side in the axial direction) of each variable nozzle 61. Each first nozzle shaft 63 is rotatably supported by the corresponding first support hole 47 in the first nozzle ring 43. Moreover, a second nozzle shaft 65 is integrally formed at a left side surface (a side surface on another side in the axial direction) of each variable nozzle 61 and concentrically with the corresponding first nozzle shaft 63. Each second nozzle shaft 65 is rotatably supported by the corresponding second support hole 57 in the second nozzle ring 51. Here, the variable nozzles 61 are arranged at equal intervals in the circumferential direction. However, the intervals do not have to be equal. Each variable nozzle 61 may be provided with the first nozzle shaft 63 and the second nozzle shaft 65 to be supported from both sides thereof, or deprived of the second nozzle shaft 65 to be supported from one side thereof.

A link mechanism 69 is disposed in an annular link chamber 67 formed on the opposite surface side from the opposed surface of the first nozzle ring 43. The link mechanism 69 is connected to the first nozzle shafts 63 of the variable nozzles 61 and rotates the variable nozzles 61 synchronously in the opening direction or the closing direction. Meanwhile, the link mechanism 69 is formed from a publicly known configuration as disclosed in Japanese Patent Application Publications No. 2009-243300 and No. 2009-243432, for example. The link mechanism 69 is connected to a rotating actuator (not shown) such as a rotary motor or a rotary cylinder, which rotates the variable nozzles 61 in the opening direction or the closing direction, through a power transmission mechanism 71. Here, the link mechanism 69 may be disposed on the opposite surface side from the opposed surface of the second nozzle ring 51 instead of being disposed on the opposite surface side from the opposed surface of the first nozzle ring 43 (in the link chamber 67).

Next, configurations of components surrounding the variable nozzle unit 41 will be described.

As shown in FIG. 1, the bearing housing 3 includes a side surface which is opposed to a back surface 31b of the turbine disk 31. An annular heat shield plate 73 is integrally provided at a central part of the side surface by being fastened with countersunk bolts 75 (only one of which is illustrated). The heat shield plate 73 shields heat from the turbine wheel 29 side. The heat shield plate 73 is located concentrically with the turbine wheel 29. An outer peripheral surface of the heat shield plate 73 is fitted to the inner peripheral surface of the first nozzle ring 43. An annular fitting flange 77 is provided at an inner peripheral edge portion of the heat shield plate 73, and is formed to protrude in the right direction. The fitting flange 77 is fitted to a circular fitting groove 79 which is formed in a central part of the side surface of the bearing housing 3 mentioned above. Here, the circular fitting groove 79 is formed concentrically with the turbine wheel 29. Moreover, the heat shield plate 73 includes a side surface which is opposed to the back surface 31b of the turbine disk 31. In this side surface, an annular housing recess (a housing stepped portion) 80 is formed. The housing recess 80 is formed to recede in the right direction (the one side in the axial direction) and houses an outer edge portion of the turbine disk 31 (part of the turbine wheel 29). A circular fitting groove 81 is formed in an outer peripheral surface of the heat shield plate 73. Here, a fastened portion F between the bearing housing 3 and the heat shield plate 73 is an annular sealing portion which suppresses a leakage of the exhaust gas from a back surface 73b side of the heat shield plate 73 to the back surface 31b side of the turbine disk 31. In other words, the fastened portion F is formed from portions of the bearing housing 3 and the heat shield plate 73 which come into contact with each other by means of fastening. This contact suppresses the leakage of the exhaust gas.

Two first seal rings 83 serving as an example of a seal member are brought into pressure contact, by their own elastic force, with a bottom surface 49u of the first stepped portion 49 of the first nozzle ring 43 (part of the inner peripheral surface of the first nozzle ring 43). The first seal rings 83 suppress the leakage of the exhaust gas from the opposite surface side from the opposed surface of the first nozzle ring 43 to the inlet side of the turbine wheel 29. Meanwhile, an inner peripheral edge portion of each first seal ring 83 is fitted in the circular fitting groove 81 in the heat shield plate 73. In other words, the first seal rings 83 are held by their own elastic force between the inner peripheral surface of the first nozzle ring 43 and the outer peripheral surface of the heat shield plate 73.

A circular fitting groove 85 is formed in an outer peripheral surface of the protrusion 55 of the turbine housing 27. Two second seal rings 87 (an example of a different seal member) serving as an example of a different seal member are brought into pressure contact, by their own elastic force, with a bottom surface 59u of the second stepped portion 59 of the second nozzle ring 51 (part of the inner peripheral surface of the second nozzle ring 51). The second seal rings 87 suppress the leakage of the exhaust gas from the opposite surface side from the opposed surface of the second nozzle ring 51 to the inlet side of the turbine wheel 29. Meanwhile, an inner peripheral edge portion of each second seal ring 87 is fitted in the circular fitting groove 85 in the protrusion 55 of the turbine housing 27. In other words, the second seal rings 87 are held by their own elastic force between the inner peripheral surface of the second nozzle ring 51 and the outer peripheral surface of the protrusion 55 of the turbine housing 27.

Next, operation and effect of the embodiment of the present disclosure will be described.

The exhaust gas is taken in from the gas intake port 35 and flows from the inlet side to the outlet side of the turbine wheel 29 via the turbine scroll passage 37. In the course of the flow of the exhaust gas, rotational force (rotation torque) is generated by using pressure energy of the exhaust gas, so that the rotor shaft 9 and the compressor wheel 13 can be rotated integrally with the turbine wheel 29. Thus, the air taken in from the air intake port 19 can be compressed and discharged from the air exhaust port 25 via the diffuser passage 21 and the compressor scroll passage 23, and the air to be supplied to the engine can be supercharged (compressed) accordingly.

If the number of revolutions of the engine is in a high-revolution range and a flow rate of the exhaust gas is high when the variable geometry system turbocharger 1 is in operation, the variable nozzles 61 are rotated synchronously in the forward direction (the opening direction) while operating the link mechanism 69 by the drive of the rotary actuator. Thus, it is possible to supply a large amount of the exhaust gas to the turbine wheel 29 side by increasing the passage area (the throat area) of the exhaust gas to be supplied to the turbine wheel 29 side.

If the number of revolutions of the engine is in a low-revolution range and the flow rate of the exhaust gas is low, the variable nozzles 61 are rotated synchronously in the reverse direction (the closing direction) while operating the link mechanism 69 by the drive of the rotary actuator. Thus, it is possible to increase a flow velocity of the exhaust gas by reducing the passage area for the exhaust gas to be supplied to the turbine wheel 29 side, and to yield a sufficient work output from the turbine wheel 29.

The heat shield plate 73 is fastened with the countersunk bolts 75 and thus integrally provided to the side surface of the bearing housing 3 opposed to the back surface 31b of the turbine disk 31. Moreover, the two first seal rings 83 are provided between the inner peripheral surface of the first nozzle ring 43 and the outer peripheral surface of the heat shield plate 73. Accordingly, the leakage of the exhaust gas from the opposite surface side from the opposed surface of the first nozzle ring 43 to the inlet side of the turbine wheel 29 can be suppressed without using the biasing member such as the wave washer, or in other words, without constantly applying the force in the axial direction to the variable nozzle unit 41. Thus, it is possible to set the nozzle side clearance small by suppressing complication of a thermal deformation of the variable nozzle unit 41 and sufficiently ensuring the parallelism between the opposed surface of the first nozzle ring 43 and the opposed surface of the second nozzle ring 51 when the variable geometry system turbocharger 1 is in operation.

The inner diameter of the first nozzle ring 43 and the inner diameter of the second nozzle ring 51 are set to an equal dimension, while the outer diameter of the first nozzle ring 43 and the outer diameter of the second nozzle ring 51 are set to an equal dimension. As a consequence, it is possible to reduce a difference in thermal expansion in the radial direction between the first nozzle ring 43 and the second nozzle ring 51 when the variable geometry system turbocharger 1 is in operation, and to suppress a misalignment between each first support hole 47 in the first nozzle ring 43 and the corresponding second support hole 57 in the second nozzle ring 51. Moreover, since the two seal rings 87 are provided between the inner peripheral surface of the second nozzle ring 51 and the outer peripheral surface of the protrusion 55 of the turbine housing 27, it is possible to suppress the leakage of the exhaust gas from the opposite surface side from the opposed surface of the second nozzle ring 51 to the inlet side of the turbine wheel 29.

The outer edge portion of the turbine disk 31 is housed in the annular housing recess 80. Accordingly, it is possible to suppress the leakage of the exhaust gas from the variable nozzle 61 side to the back surface 31b side of the turbine disk 31. Moreover, the fastened portion F between the bearing housing 3 and the heat shield plate 73 is the annular sealing portion. Accordingly, it is possible to suppress the leakage of the exhaust gas from the back surface 73b side of the heat shield plate 73 to the back surface 31b side of the turbine disk 31.

Each first support hole 47 in the first nozzle ring 43 is bottomless (is a penetrating hole), so that the opposite surface side of the opposed surface of the first nozzle ring 43 communicates with the turbine scroll passage 37. Meanwhile, each second support hole 57 in the second nozzle ring 51 is bottomed. Accordingly, in each variable nozzle 61, pressure that acts on an end surface of the first nozzle shaft 63 can be made sufficiently larger than pressure that acts on an end surface of the second nozzle shaft 65 when the variable geometry system turbocharger 1 is in operation. In this way, it is possible to bring each variable nozzle 61 closer to the opposed surface side of the second nozzle ring 51 by using the difference in pressure and thus to reduce a leakage flow from the nozzle side clearance on the opposed surface side of the second nozzle ring 51 when the variable geometry system turbocharger 1 is in operation.

According to this embodiment, the leakage of the exhaust gas from the opposite surface side from the opposed surface of the first nozzle ring 43, and the like, to the inlet side of the turbine wheel 29 can be suppressed. In addition, it is possible to set the nozzle side clearance small by sufficiently ensuring the parallelism between the opposed surface of the first nozzle ring 43 and the opposed surface of the second nozzle ring 51 when the variable geometry system turbocharger 1 is in operation. As a consequence, the turbine efficiency of the variable geometry system turbocharger 1 can be further improved by reducing the leakage flow from the nozzle side clearance while sufficiently ensuring operational reliability of the variable geometry system turbocharger 1.

A misalignment between each first support hole 47 in the first nozzle ring 43 and the corresponding second support hole 57 in the second nozzle ring 51 can be suppressed when the variable geometry system turbocharger 1 is in operation. Accordingly, it is possible to ensure the operational reliability of the variable geometry system turbocharger 1 even more sufficiently. In addition, the leakage flow from the nozzle side clearance on the opposed surface side of the second nozzle ring 51 can be reduced while suppressing the leakage of the exhaust gas from the variable nozzle 61 side and the like to the back surface 31b side of the turbine disk 31. Thus, it is possible to further improve the turbine efficiency of the variable geometry system turbocharger 1 by stabilizing a flow of the exhaust gas on the shroud 27s side of the turbine housing 27 in the turbine wheel 29.

(First Modified Example)

A first modified example of the embodiment of the present disclosure will be described with reference to FIG. 4. Here, as shown in the drawing, "L" indicates the left direction, "R" indicates the right direction, "D1" indicates the axial direction, and "D2" indicates the radial direction.

Figure 4:
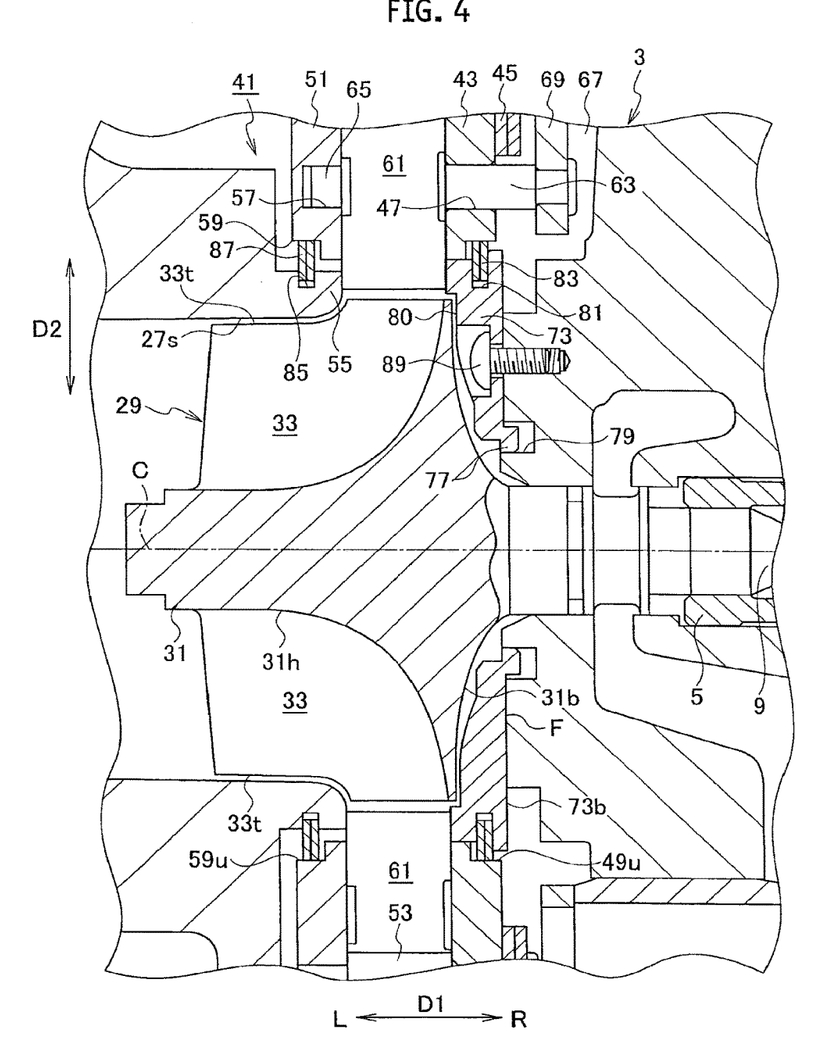
FIG. 4 is a cross-sectional view showing characteristic portions of a variable geometry system turbocharger according to a first modified example of the embodiment of the present disclosure.

As shown in FIG. 4, instead of the countersunk bolts 75 (see FIG. 1), button bolts 89 may be used as fastening members for providing the heat shield plate 73 integrally at the central part of the side surface of the bearing housing 3. In this case, the heat shield plate 73 is allowed to be displaced in the radial direction with respect to the button bolts 89 and the like. As mentioned above, the shape of each bolt head is not limited to a particular shape. For example, though the illustration is omitted, hexagon bolts, hexagon socket bolts, lobular socket bolts, and the like are also applicable.

The first modified example of the embodiment of the present disclosure has operation and effect similar to the above-described embodiment of the present disclosure.

(Second Modified Example)

Figure 5:
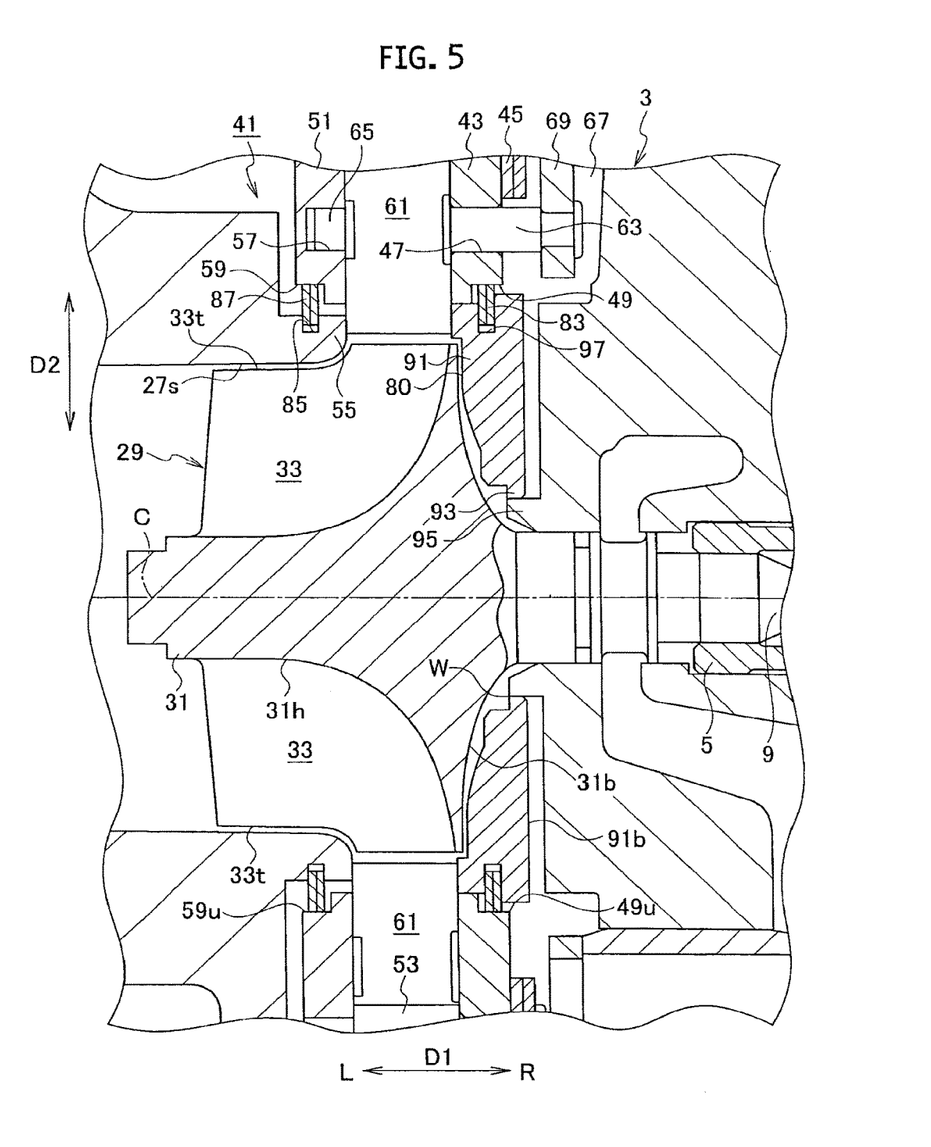
FIG. 5 is a cross-sectional view showing characteristic portions of a variable geometry system turbocharger according to a second modified example of the embodiment of the present disclosure.

A second modified example of the embodiment of the present disclosure will be described with reference to FIG. 5. As shown in the drawing, "L" indicates the left direction, "R" indicates the right direction, "D1" indicates the axial direction, and "D2" indicates the radial direction.

Here, the fastening members for providing the heat shield plate 73 integrally at the central part of the side surface of the bearing housing 3 may be omitted. In this case, as shown in FIG. 5, an annular heat shield plate 91 is provided integrally at the central part of the side surface of the bearing housing 3 by laser welding. The heat shield plate 91 is located concentrically with the turbine wheel 29, and an outer peripheral surface of the heat shield plate 91 is fitted to the inner peripheral surface of the first nozzle ring 43. Here, a welded portion W between the bearing housing 3 and the heat shield plate 91 is an annular sealing portion which suppresses the leakage of the exhaust gas from a back surface 91b side of the heat shield plate 91 to the back surface 31b side of the turbine disk 31. Note that other welding methods including TIG welding, MIG welding, electron beam welding, friction welding, and the like may be used instead of laser welding.

An annular fitting flange 93 is provided at an inner peripheral edge portion of the heat shield plate 91, and is formed to protrude inward in the radial direction. The fitting flange 93 of the heat shield plate 91 is fitted to an outer peripheral surface of a fitting protrusion 95. The fitting protrusion 95 is provided at the central part of the side surface of the bearing housing 3 opposed to the back surface 31b of the turbine disk 31, and is formed to protrude toward the turbine disk 31 side. Meanwhile, a circular fitting groove 97 is formed in the outer peripheral surface of the heat shield plate 91. An inner peripheral edge portion of each first seal ring 83 is fitted in the circular fitting groove 97 in the heat shield plate 91.

The second modified example of the embodiment of the present disclosure has operation and effect similar to the above-described embodiment of the present disclosure.

It is to be understood that the present disclosure is not limited only to the description of the embodiment mentioned above, but can be embodied in various other aspects as follows, for example.

Specifically, instead of providing the heat shield plate 73 integrally at the central part of the side surface of the bearing housing 3 opposed to the back surface 31b of the turbine disk 31 either by means of fastening with the attachment bolts or by means of welding, the heat shield plate 73 may be integrally provided by means of a press-fitting action using a press-fitting recess formed in one of the bearing housing 3 and the heat shield plate 73 and a press-fitting protrusion formed at the remaining one of the bearing housing 3 and the heat shield plate 73. Meanwhile, the number of the first seal rings 83 or the second seal rings 87 may be changed into one or more than two. A shape of a joint of the first seal ring 83 or the second seal ring 87 may adopt any of straight cut, step cut, angle cut, and the like. Furthermore, instead of the first seal rings 83 or the second seal rings 87, metal O-rings or metal gaskets (metal gaskets having a U-shaped cross section, metal gaskets having a V-shaped cross section, metal gaskets having a C-shaped cross section, and the like) may be used as the seal members or the different seal members.

It is to be noted that the scope of rights encompassed by the present disclosure is not limited to these embodiments.

What is claimed is:

1. A variable geometry system turbocharger comprising:
   a variable nozzle unit disposed between a turbine scroll passage and a turbine wheel in a turbine housing adjacent to a bearing housing, the variable nozzle unit being configured to adjust a passage area for exhaust gas to be supplied to the turbine wheel, and
   a support ring including an outer peripheral edge sandwiched between the bearing housing and the turbine housing, configured to support the variable nozzle unit,
   wherein the variable nozzle unit includes:
   a first nozzle ring disposed in the turbine housing, including an inner peripheral surface facing radially inward;
   a second nozzle ring opposed to the first nozzle ring in an axial direction;
   a plurality of variable nozzles disposed at intervals in a circumferential direction between the first nozzle ring and the second nozzle ring, and rotatably provided around nozzle axes thereof parallel to the axial direction;
   a link configured to rotate the plurality of variable nozzles synchronously;
   an annular heat shield plate provided between the bearing housing and the turbine wheel, configured to shield heat from a turbine wheel side of the turbine housing toward the bearing housing, the annular heat shield plate including an outer peripheral surface facing radially outward and opposed to the inner peripheral surface of the first nozzle ring; and
   a first seal member provided between the inner peripheral surface of the first nozzle ring and the outer peripheral surface of the heat shield plate.

2. The variable geometry system turbocharger according to claim 1, wherein the heat shield plate is fastened to the bearing housing with an attachment bolt.

3. The variable geometry system turbocharger according to claim 2, wherein a fastened portion between the bearing housing and the heat shield plate is an annular sealing portion configured to suppress a leakage of the exhaust gas from a back surface side of the heat shield plate to a back surface side of the turbine wheel.

4. The variable geometry system turbocharger according to claim 1, further comprising
   a second seal member, wherein
   the second nozzle ring includes an inner peripheral surface facing radially inward and surrounding an annular portion of the turbine housing, the annular portion being integrally formed with the turbine housing and located between the turbine scroll passage and the turbine wheel, and
   the second seal member is provided between the inner peripheral surface of the second nozzle ring and an outer peripheral surface of the annular portion of the turbine housing.

5. The variable geometry system turbocharger according to claim 4, wherein
   the first seal member and the second seal member are seal rings.

6. The variable geometry system turbocharger according to claim 1, wherein
   the first nozzle ring is provided with a plurality of first support through holes formed in the first nozzle ring at intervals in the circumferential direction,
   the second nozzle ring is provided with a plurality of second support blind holes formed in the second nozzle ring and aligned with the plurality of first support through holes,
   each of the plurality of variable nozzles includes: a first side surface facing the first nozzle ring, a second side surface facing the second nozzle ring, a first nozzle shaft integrally provided with the first side surface, and a second nozzle shaft integrally provided with the second first side surface, the first nozzle shaft being rotatably supported by a corresponding one of the plurality of the first support through holes in the first nozzle ring, and the second nozzle shaft being rotatably supported by a corresponding one of the plurality of the second support blind holes in the second nozzle ring, and
   the turbine scroll passage communicates with a link chamber in which the link is accommodated and end surfaces of the first nozzle shafts of the plurality of variable nozzles are exposed, the communication between the turbine scroll passage and the link chamber allowing airflow therebetween.

7. The variable geometry system turbocharger according to claim 1, wherein the heat shield plate includes a surface opposed to the turbine wheel, the surface is provided with an annular housing recess to house part of the turbine wheel, and the annular housing recess recedes toward the bearing housing.

8. The variable geometry system turbocharger according to claim 1, wherein an inner diameter of the first nozzle ring and an inner diameter of the second nozzle ring are set to an equal dimension, and an outer diameter of the first nozzle ring and an outer diameter of the second nozzle ring are set to an equal dimension.

* * * * *